(12) United States Patent
Okuyama et al.

(10) Patent No.: US 10,505,593 B2
(45) Date of Patent: Dec. 10, 2019

(54) WIRELESS COMMUNICATION SYSTEM AND MANAGEMENT APPARATUS

(71) Applicant: NTT DOCOMO, INC., Tokyo (JP)

(72) Inventors: Tatsuki Okuyama, Tokyo (JP); Satoshi Suyama, Tokyo (JP); Tatsunori Obara, Tokyo (JP); Yukihiko Okumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/082,592

(22) PCT Filed: Mar. 2, 2017

(86) PCT No.: PCT/JP2017/008335
§ 371 (c)(1),
(2) Date: Sep. 6, 2018

(87) PCT Pub. No.: WO2017/154739
PCT Pub. Date: Sep. 14, 2017

(65) Prior Publication Data
US 2019/0074870 A1 Mar. 7, 2019

(30) Foreign Application Priority Data

Mar. 11, 2016 (JP) .................................. 2016-048754

(51) Int. Cl.
*H04B 7/024* (2017.01)
*H04B 7/06* (2006.01)
(Continued)

(52) U.S. Cl.
CPC .............. *H04B 7/024* (2013.01); *H04B 7/06* (2013.01); *H04B 7/0632* (2013.01);
(Continued)

(58) Field of Classification Search
CPC ........ H04B 7/024; H04B 7/06; H04B 7/0632; H04B 7/0639; H04L 5/0023;
(Continued)

(56) References Cited

U.S. PATENT DOCUMENTS 6,313,789 B1 * 11/2001 Zhodzishsky ........... G01S 19/29
342/357.68
7,236,553 B1 * 6/2007 Choi ...................... H04L 7/0008
375/325
(Continued)

FOREIGN PATENT DOCUMENTS

| JP | 2014-165506 A | 9/2014 |
|---|---|---|
| WO | 2014163138 A1 | 10/2014 |

OTHER PUBLICATIONS

International Search Report issued in PCT/JP2017/008335 dated May 23, 2017 (3 pages).
(Continued)

*Primary Examiner* — James M Perez
(74) *Attorney, Agent, or Firm* — Osha Liang LLP

(57) ABSTRACT

A wireless communication system includes: a plurality of first wireless stations; a plurality of second wireless stations; and a management apparatus configured to manage the plurality of first wireless stations and the plurality of second wireless stations. The management apparatus includes a selection unit that selects a plurality of antennas to be used to transmit reference signals from a plurality of antennas included in the plurality of first wireless stations or a plurality of antennas included in the plurality of second wireless stations, and an instruction unit that instructs the plurality of first wireless stations or the plurality of second wireless stations to transmit reference signals using the plurality of antennas used to transmit the reference signals and selected by the selection unit.

4 Claims, 12 Drawing Sheets

(51) Int. Cl.
*H04W 16/28* (2009.01)
*H04L 27/26* (2006.01)
*H04W 28/26* (2009.01)
*H04W 72/04* (2009.01)
*H04L 5/00* (2006.01)

(52) U.S. Cl.
CPC ......... *H04B 7/0639* (2013.01); *H04L 5/0023* (2013.01); *H04L 5/0048* (2013.01); *H04L 27/2691* (2013.01); *H04W 16/28* (2013.01); *H04W 28/26* (2013.01); *H04W 72/046* (2013.01)

(58) Field of Classification Search
CPC .. H04L 5/0048; H04L 27/2691; H04W 16/28; H04W 28/16; H04W 28/26; H04W 72/04; H04W 72/046
USPC .................. 375/260–285, 295–296
See application file for complete search history.

(56) References Cited

U.S. PATENT DOCUMENTS

| | | | | |
|---|---|---|---|---|
| 8,289,917 | B1* | 10/2012 | Koivisto | H04L 5/0048 370/252 |
| 9,531,459 | B2* | 12/2016 | Harrison | H04B 7/0456 |
| 9,722,744 | B2* | 8/2017 | Siomina | A61K 38/39 |
| 9,820,290 | B2* | 11/2017 | Lee | H04B 7/0473 |
| 9,853,807 | B2* | 12/2017 | Tsai | H03L 7/0994 |
| 10,090,994 | B2* | 10/2018 | Tsai | H03L 7/0994 |
| 10,212,629 | B2* | 2/2019 | Kishiyama | H04W 36/0083 |
| 10,256,888 | B2* | 4/2019 | Lee | H04B 7/0417 |
| 10,277,430 | B2* | 4/2019 | Baker | H04B 7/024 |
| 10,367,677 | B2* | 7/2019 | Parkvall | H04J 11/0079 |
| 2003/0034846 | A1* | 2/2003 | Fan | H03L 7/0893 331/17 |
| 2010/0322090 | A1* | 12/2010 | Zhang | H04W 52/346 370/252 |
| 2011/0092241 | A1* | 4/2011 | Kawai | H04B 7/0404 455/509 |
| 2011/0249665 | A1* | 10/2011 | Seyama | H04L 27/2646 370/350 |
| 2012/0269278 | A1* | 10/2012 | Onggosanusi | H04B 7/024 375/267 |
| 2013/0021929 | A1* | 1/2013 | Kim | H04B 7/024 370/252 |
| 2013/0034066 | A1* | 2/2013 | Kakishima | H04L 27/2613 370/329 |
| 2013/0077513 | A1* | 3/2013 | Ng | H04B 7/024 370/252 |
| 2013/0094380 | A1* | 4/2013 | Taoka | H04B 7/0417 370/252 |
| 2013/0107791 | A1* | 5/2013 | Oh | H04B 7/0452 370/312 |
| 2013/0242773 | A1* | 9/2013 | Wernersson | H04B 7/024 370/252 |
| 2013/0279437 | A1* | 10/2013 | Ng | H04W 48/16 370/329 |
| 2013/0288730 | A1* | 10/2013 | Gomadam | H04W 24/00 455/509 |
| 2013/0301542 | A1* | 11/2013 | Krishnamurthy | H04W 52/50 370/329 |
| 2014/0011468 | A1* | 1/2014 | Park | H04B 7/0802 455/272 |
| 2014/0219162 | A1* | 8/2014 | Eyuboglu | H04W 16/26 370/315 |
| 2014/0301301 | A1* | 10/2014 | Cheng | H04L 5/0048 370/329 |
| 2014/0307648 | A1* | 10/2014 | Nagata | H04W 16/32 370/329 |
| 2014/0348096 | A1* | 11/2014 | Nagata | H04W 72/1247 370/329 |
| 2015/0009914 | A1* | 1/2015 | Chen | H04L 5/0073 370/329 |
| 2015/0016379 | A1* | 1/2015 | Nam | H04B 7/0456 370/329 |
| 2015/0036658 | A1* | 2/2015 | Mochizuki | H04W 24/10 370/331 |
| 2015/0103934 | A1* | 4/2015 | Nam | H04B 7/0413 375/260 |
| 2015/0162922 | A1* | 6/2015 | Song | H04L 7/0091 375/376 |
| 2015/0208394 | A1* | 7/2015 | Seo | H04L 5/0053 370/329 |
| 2015/0326290 | A1* | 11/2015 | Harrison | H04B 7/0456 375/260 |
| 2016/0057689 | A1* | 2/2016 | Fujishiro | H04W 36/16 370/331 |
| 2016/0165457 | A1* | 6/2016 | Inoue | H04W 16/28 455/562.1 |
| 2016/0234706 | A1* | 8/2016 | Liu | H04L 5/0048 |
| 2016/0254888 | A1* | 9/2016 | Nagata | H04W 16/28 370/329 |
| 2016/0344487 | A1* | 11/2016 | Lee | H04B 17/309 |
| 2016/0345216 | A1* | 11/2016 | Kishiyama | H04W 36/0083 |
| 2017/0006492 | A1* | 1/2017 | Khoshnevisan | H04B 7/0626 |
| 2017/0078863 | A1* | 3/2017 | Kim | H04W 48/16 |
| 2017/0272992 | A1* | 9/2017 | Fujishiro | H04W 36/22 |
| 2017/0310457 | A1* | 10/2017 | Tsai | H03L 7/0994 |
| 2017/0331670 | A1* | 11/2017 | Parkvall | H04W 52/0274 |
| 2017/0339717 | A1* | 11/2017 | Futaki | H04W 16/14 |
| 2018/0054244 | A1* | 2/2018 | Kim | G01S 7/52095 |
| 2018/0109370 | A1* | 4/2018 | Tsai | H03L 7/0994 |
| 2018/0152192 | A1* | 5/2018 | Tsai | H03L 7/087 |
| 2018/0248601 | A1* | 8/2018 | Kishiyama | H04W 16/28 |
| 2018/0331860 | A1* | 11/2018 | Bergman | H04L 5/0023 |
| 2019/0007897 | A1* | 1/2019 | Ng | H04W 48/16 |
| 2019/0058575 | A1* | 2/2019 | Tsai | H03L 7/0994 |
| 2019/0074870 | A1* | 3/2019 | Okuyama | H04B 7/0632 |

OTHER PUBLICATIONS

Written Opinion issued in PCT/JP2017/008335 dated May 23, 2017 (3 pages).
Office Action issued in the counterpart Japanese Patent Application No. 2016-048754, dated Jun. 11, 2019 (10 pages).

\* cited by examiner

DISTRIBUTED ARRANGEMENT EXAMPLE ASSUMED IN 4G

IMPROVEMENT IN RECEPTION POWER AT CELL EDGE

FIG.12

| TRANSMISSION POINT | MOBILE STATION 3a | MOBILE STATION 3b |
|---|---|---|
| 1 | 3 | - |
| 2 | 4 | 2 |
| 3 | 2 | 3 |
| 4 | 10 | 9 |
| 5 | - | 4 |
| 6 | 4 | 4 |
| 7 | - | - |
| 8 | - | - |
| 9 | - | - |
| 10 | - | 5 |
| 11 | - | 5 |

FIG.13
BEFORE SELECTION
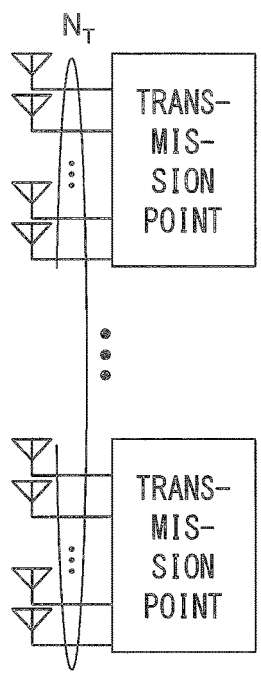
AFTER SELECTION
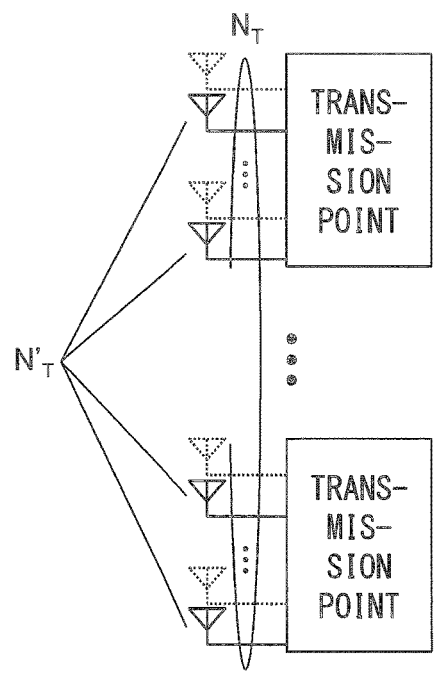

WIRELESS COMMUNICATION SYSTEM AND MANAGEMENT APPARATUS

TECHNICAL FIELD

The present invention relates to a wireless communication system and a management apparatus.

BACKGROUND ART

In long term evolution (LTE), various wireless technologies have been examined to realize larger capacity of systems, further acceleration of data transmission speeds, further low delay of wireless sections, and the like.

In LTE, a technology referred to as coordinated multipoint (CoMP) in which a plurality of base stations cooperate to be able to transmit and receive wireless signals is realized. In CoMP, when a plurality of base stations cooperate to transmit and receive downlink signals, it is possible to improve reception quality at a cell end at which a plurality of cells overlap each other. An example of cooperation transmission in LTE is illustrated in FIG. 1.

CITATION LIST

Patent Document

Patent Document 1: JP 2014-165506 A

SUMMARY OF THE INVENTION

Problem to be Solved by the Invention

Here, when a very high density distributed antenna system in which many base stations are distributed at very high density, many cells are overlapped, and many base stations cooperate to transmit and receive wireless signals can be constructed, a system capacity is considered to be further increased. With an increase in the system capacity, many terminals are considered to be accommodated within an area. An example of the very high density distributed antenna system is illustrated in FIG. 2.

However, when MIMO transmission is performed in a very high density distributed antenna system in which many base stations are disposed at very high density, there is a problem in that the number of downlink reference signals and the number of uplink reference signals used for estimation (channel estimation) of propagation information between an antenna element included in each base station and an antenna element included in each terminal increase.

FIG. 3 is a diagram for describing the problem. For example, it is assumed that "$N_T$" is a sum of the number of antenna elements included in base stations and "$N_{Ri}$" is the number of antenna elements included in an i-th terminal (terminal (i)). In this case, to be able to estimate propagation information $H_i$ ($N_T \times N_{Ri}$) of a downlink (DL) between an antenna element included in the terminal (i) and an antenna element included in each base station on the side of the terminal (i), it is necessary to transmit orthogonal reference signals from each of all the antenna elements included in each base station.

Similarly, to be able to estimate propagation information of an uplink (UL) between an antenna element included in a base station and an antenna element included in each terminal on the side of the base station, it is necessary to transmit orthogonal reference signals from each of all the antenna elements included in each terminal present within a wireless communication system.

That is, to be able to perform estimation (channel estimation) of all the pieces of propagation information between antenna elements of each base station and antenna elements of each terminal, it is necessary to transmit the number of reference signals which is a sum of orthogonal reference signals equivalent to the number of all antenna elements included in each base station and orthogonal reference signals equivalent to the number of all antenna elements included in each terminal. Then, most of the restricted wireless frames are allocated to wireless frames for the reference signals, and thus there is a problem in that transmission efficiency considerably deteriorates.

The technology of the disclosure is devised in view of the forgoing circumstance and an object of the invention is to provide a technology capable of reducing the number of reference signals transmitted within a wireless communication system and efficiently using radio resources.

Means for Solving Problem

According to the technology of the disclosure, a wireless communication system includes: a plurality of first wireless stations; a plurality of second wireless stations; and a management apparatus configured to manage the plurality of first wireless stations and the plurality of second wireless stations. The management apparatus includes a selection unit that selects a plurality of antennas to be used to transmit reference signals from a plurality of antennas included in the plurality of first wireless stations or a plurality of antennas included in the plurality of second wireless stations, and an instruction unit that instructs the plurality of first wireless stations or the plurality of second wireless stations to transmit reference signals using the plurality of antennas used to transmit the reference signals and selected by the selection unit.

Effect of the Invention

The technology of the disclosure provides a technology capable of reducing the number of reference signals transmitted within a wireless communication system and efficiently using radio resources.

BRIEF DESCRIPTION OF DRAWINGS

FIG. 12 is a diagram for describing the operation example of the selection method (part 1);

FIG. 13 is a diagram for describing a selection method (part 2); and

MODE(S) FOR CARRYING OUT THE INVENTION

Hereinafter, embodiments of the invention will be described with reference to the drawings. The embodiments to be described below are merely examples and embodiments to which the invention is applied are not limited to the following embodiments. For example, a wireless communication system according to the embodiments is assumed to be a system of a scheme conforming to LTE. However, the invention is not limited to LTE, but other schemes can also be applied.

<System Configuration>

Figure 1:
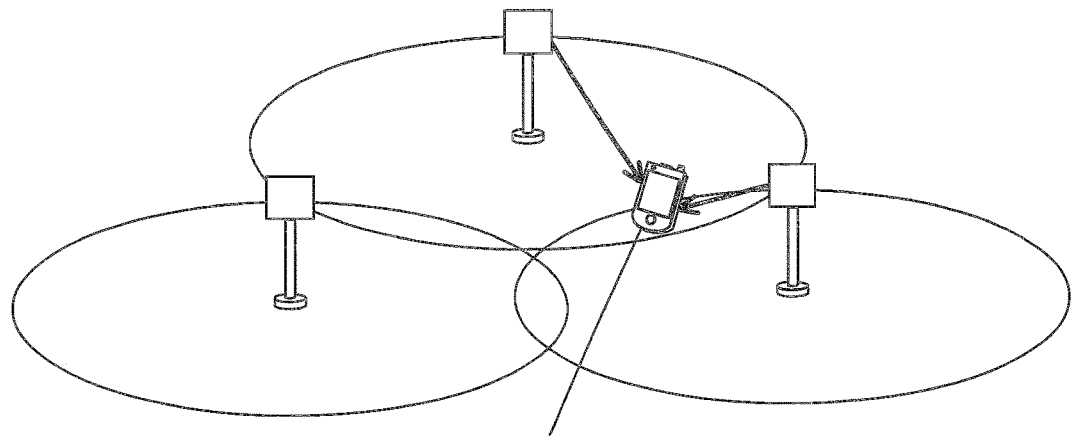
FIG. 1 is a diagram illustrating an example of cooperation transmission in LTE.
Figure 2:
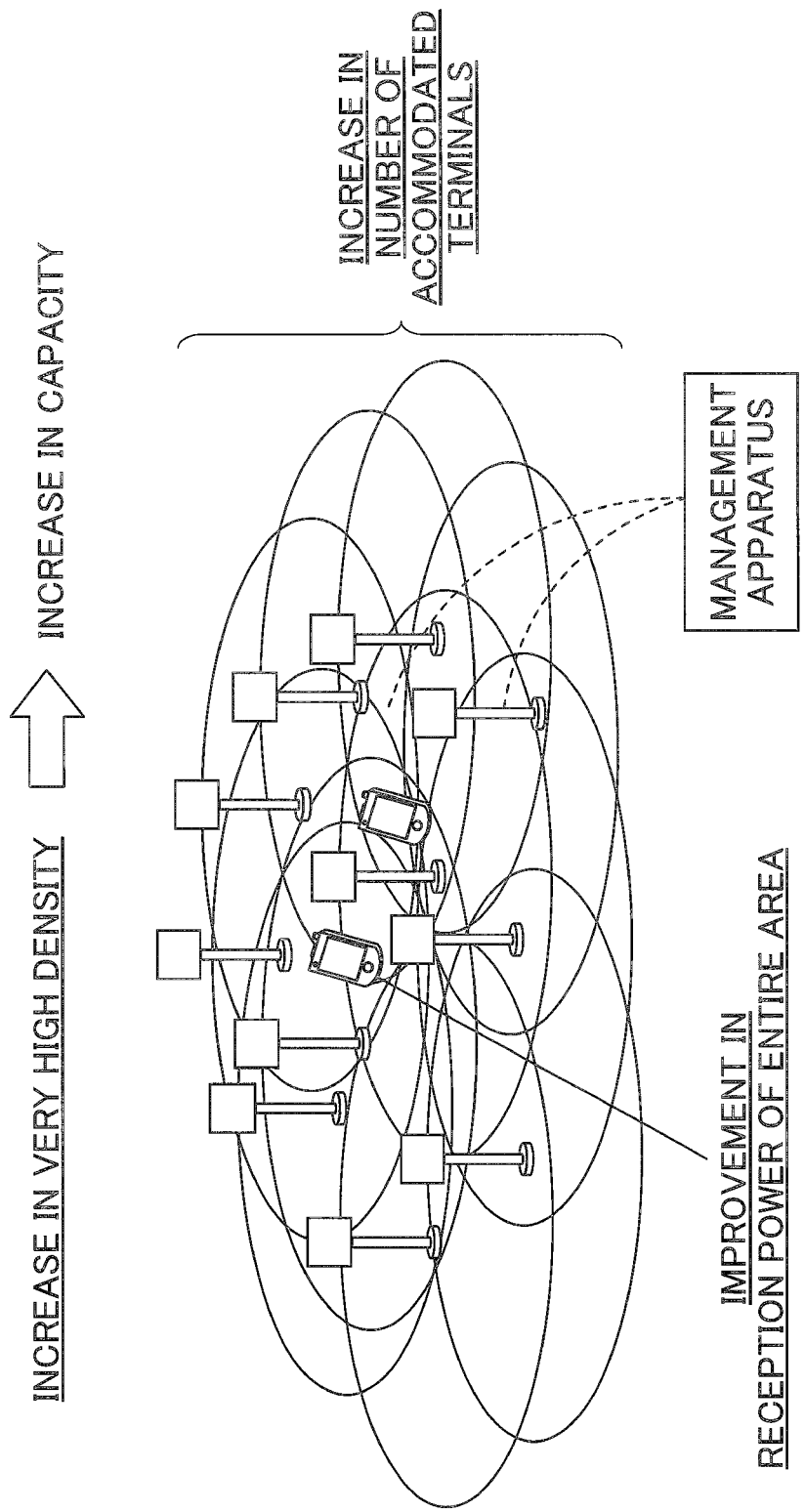
FIG. 2 is a diagram illustrating an example of a very high density distributed antenna system.
Figure 3:
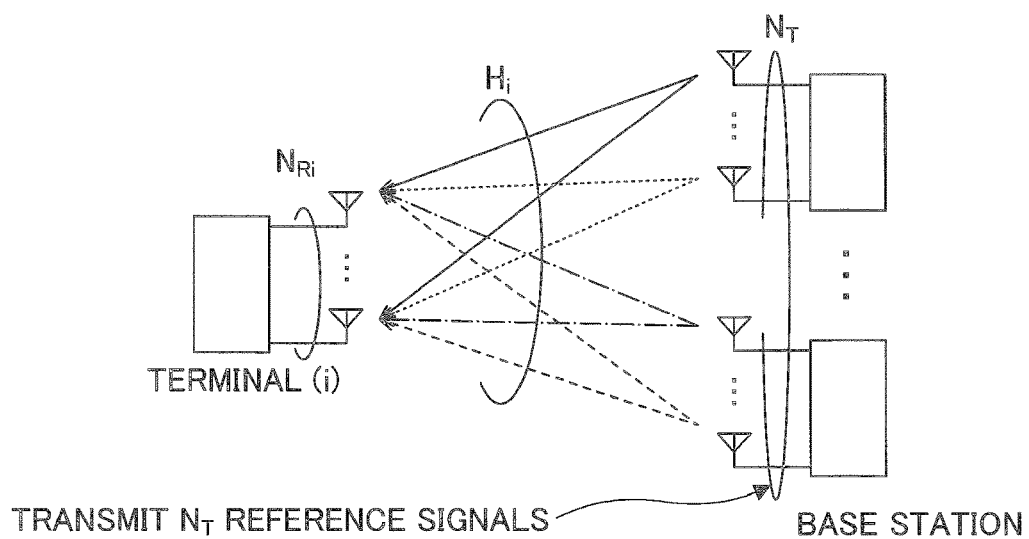
FIG. 3 is a diagram for describing a problem.
Figure 4:
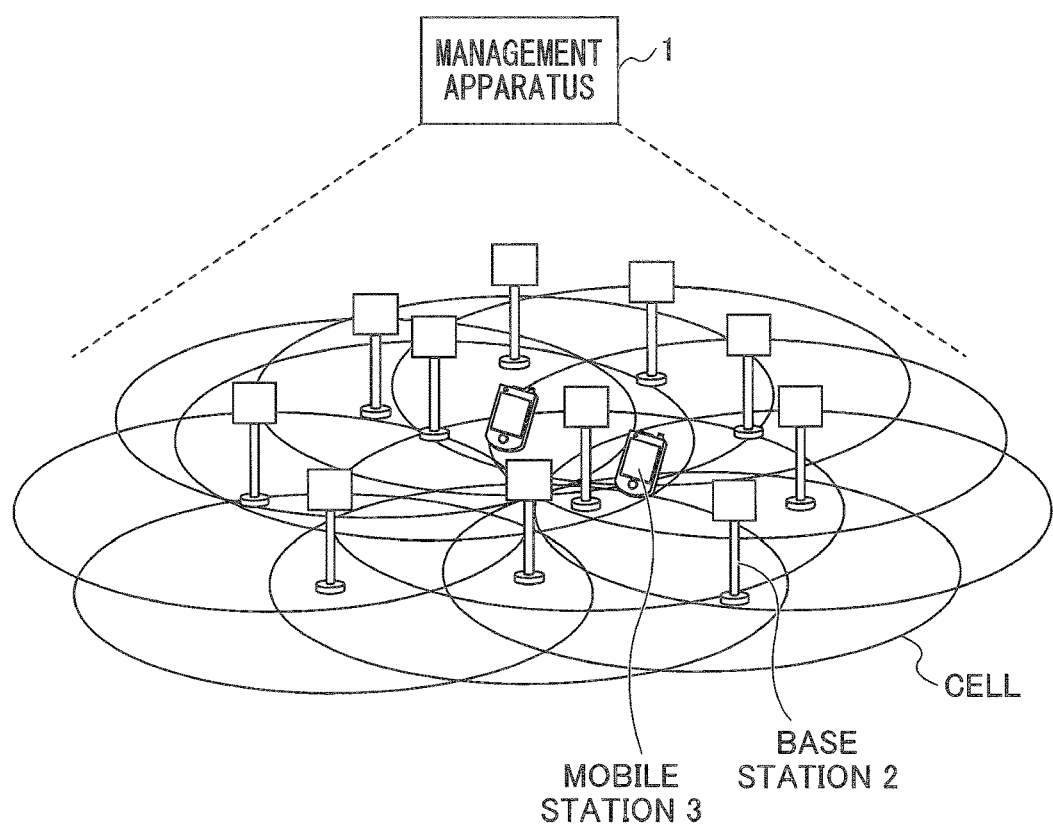
FIG. 4 is a diagram illustrating a configuration example of a wireless communication system according to an embodiment.

FIG. 4 is a diagram illustrating a configuration example of a wireless communication system according to an embodiment. The wireless communication system according to the embodiment includes a management apparatus 1, a plurality of base stations 2, and a plurality of mobile stations 3. The base stations 2 forms cells and the cells formed by the base stations 2 overlap each other.

The base station 2 includes one or more antenna elements and communicates with the mobile stations 3 using one or more antenna elements. The base stations 2 according to the embodiment include any types of base stations 2. For example, the base station may be an evolved node B (eNB) or may be a remote radio head (RRH) in LTE. The base stations 2 and the mobile stations 3 are not limited to LTE and may perform communication in conformity to any communication schemes.

The mobile station 3 includes one or more antenna elements and communicates with the mobile station 3 using one or more antenna elements. The mobile station 3 may be referred to as a user equipment (UE) or may be referred to as a terminal.

The management apparatus 1 has a function of managing the base stations 2 and the mobile stations 3 and performs various kinds of control such that the plurality of base stations 2 cooperate to transmit and receive wireless signals. The management apparatus 1 has a function of selecting an antenna element used to a reference signal. The management apparatus 1 may be referred to as central unit (CU), or may be referred to as a key station, or may be referred to as an aggregate processing apparatus.

Here, an operation example of DL communication performed by the wireless communication system according to the embodiment will be described with reference to FIG. 5. First, each mobile station 3 transmits an orthogonal UL reference signal from each of the antenna elements included in the mobile station 3 (S11). Subsequently, each base station 2 performs channel estimation between the antenna element included in each mobile station 3 and each antenna element included in the base station 2 using the UL reference signal received by each antenna element included in the base station 2 (S12). At this time, each base station 2 calculates a pre-coding matrix used to transmit a DL signal by MIMO. The wireless communication system is assumed to use time duplex division (TDD) in conformity to a duplex communication scheme. That is, the base station 2 calculates a pre-coding matrix used for a DL using propagation information estimated with the UL reference signal by using reciprocity of TDD. Any calculation method can be applied to calculation of the pre-coding matrix. For example, a block diagonalization method or a specific mode method may be used.

Subsequently, each base station 2 transmits an orthogonal DL reference signal from each antenna element included in the base station 2 (S13). Each base mobile station 3 performs channel estimation between the antenna element included in each mobile station 3 and each antenna element included in the base station 2 using the DL reference signal received by each antenna element included in the mobile station 3 (S14). Each mobile station 3 calculates a post-coding matrix used to receive a DL signal by MIMO. Subsequently, DL data is transmitted between the base station 2 and the mobile station 3 using the calculated pre-coding matrix and post-coding matrix.

Figure 5:
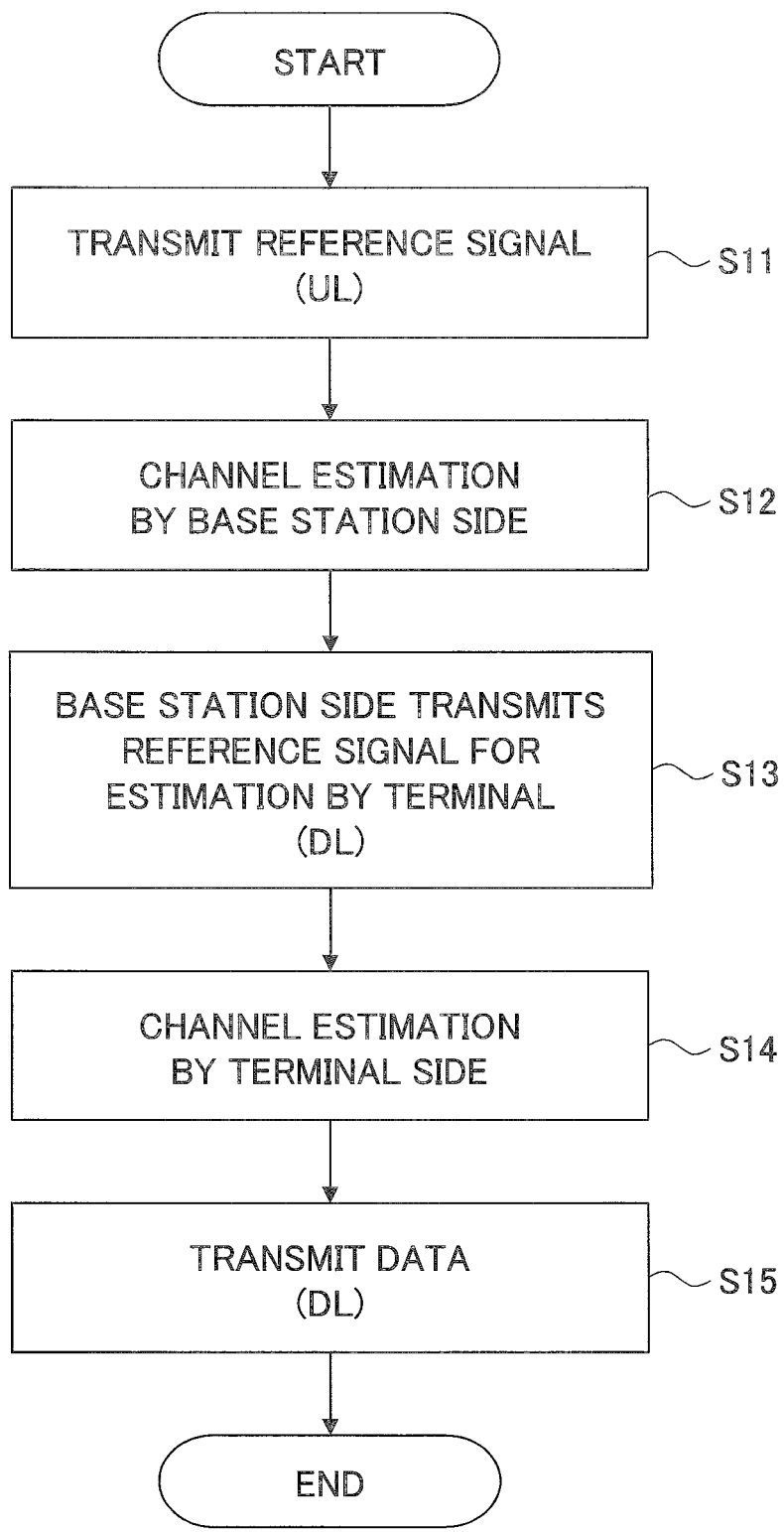
FIG. 5 is a diagram illustrating an operation example of DL communication.

In the embodiment, by limiting the antenna elements transmitting the reference signal in the transmission of the reference signal performed in the processing procedure of step S11 or S13 of FIG. 5, it is possible to reduce the number of reference signals transmitted in the wireless communication system, and thus it is possible to efficiently use radio resources.

<Functional Configuration>

(Management Apparatus)

Figure 6:
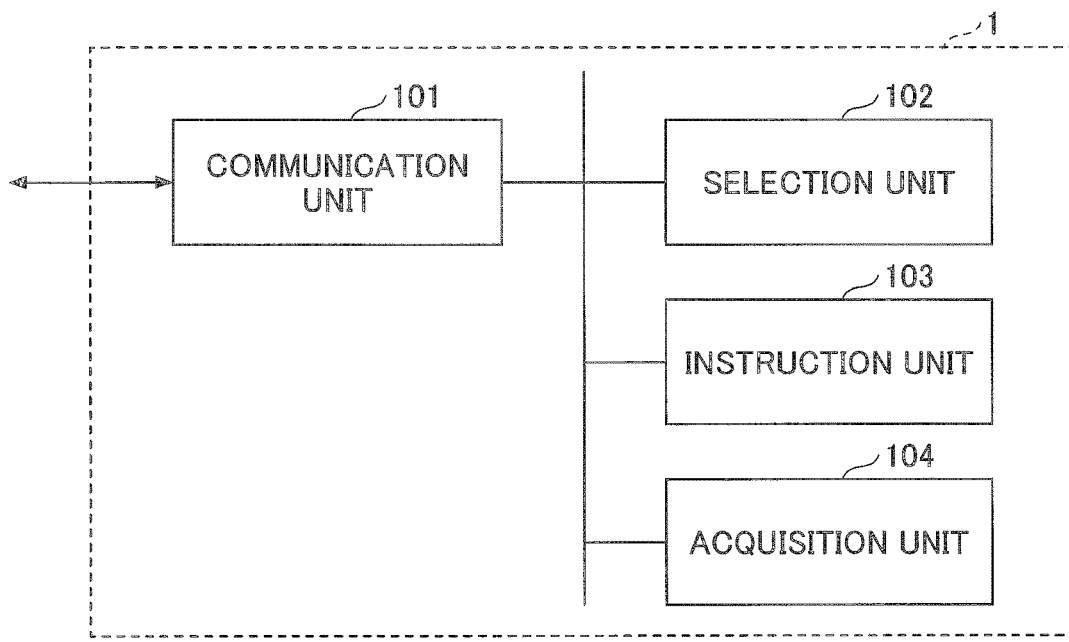
FIG. 6 is a diagram illustrating a functional configuration example of a management apparatus according to the embodiment.

FIG. 6 is a diagram illustrating a functional configuration example of a management apparatus according to the embodiment. As illustrated in FIG. 6, the management apparatus 1 includes a communication unit 101, a selection unit 102, an instruction unit 103, and an acquisition unit 104. FIG. 6 illustrates only main function units according to the embodiment, and thus functions (not illustrated) used to perform operations conforming to communication schemes used in the wireless communication system are also included. Here, some (for example, only one specific selection method or a plurality of specific selection method, a specific example, and a modification example) of the processes of the management apparatus 1 to be described in "<Processing Procedure>" to be described below may be able to be performed.

The communication unit 101 has a function of communicating with the base stations 2 and the mobile stations 3 in a wired or wireless manner. The selection unit 102 has a function of selecting antenna elements used to transmit reference signals. More specifically, the selection unit 102 has a function of selecting a plurality of antennas used to transmit reference signals among all the antenna elements included in the base stations 2 or the mobile stations 3.

The instruction unit 103 has a function of instructing the base stations 2 or the mobile stations 3 to transmit the reference signals from the antenna elements selected by the selection unit 102. The acquisition unit 104 has a function of acquiring various kinds of information of which each base station 2 or each mobile station 3 reports to the management apparatus 1.

(Base Station and Mobile Station)

Figure 7:
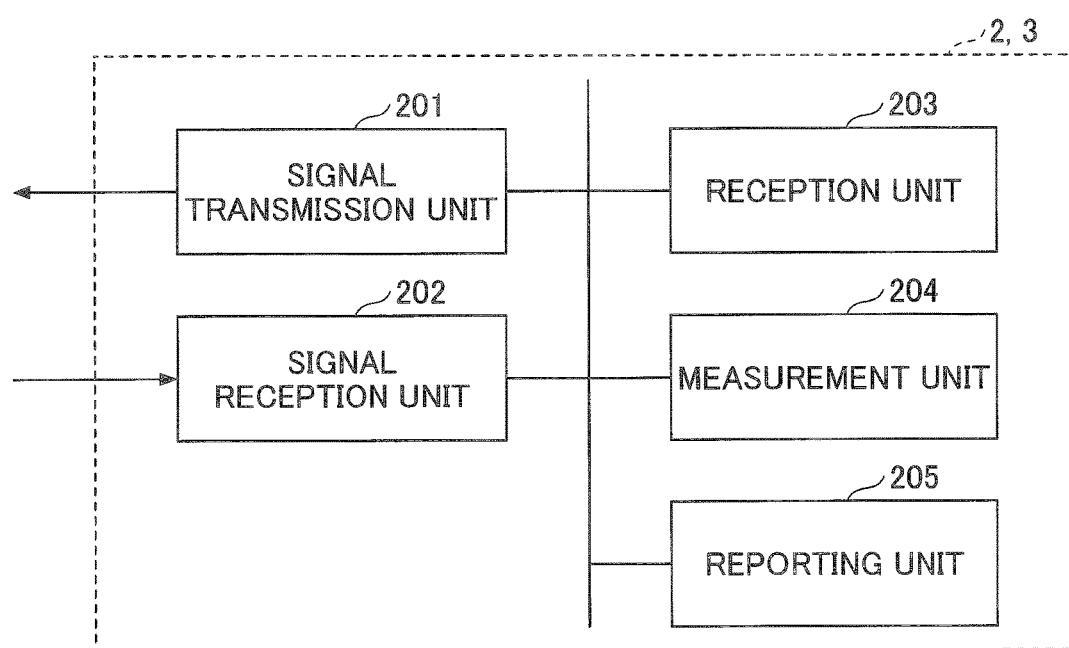
FIG. 7 is a diagram illustrating a functional configuration example of a base station and a mobile station according to the embodiment.

FIG. 7 is a diagram illustrating a functional configuration example of a base station and a mobile station according to the embodiment. As illustrated in FIG. 7, each of the base station 2 and the mobile station 3 includes a signal transmission unit 201, a signal reception unit 202, a reception unit 203, a measurement unit 204, and a reporting unit 205. FIG. 7 illustrates only main function units according to the embodiment, and thus functions (not illustrated) used to perform operations conforming to communication schemes used in the wireless communication system are also included. Here, some (for example, only one specific selection method or a plurality of specific selection method, a specific example, and a modification example) of the processes of the management apparatus 1 to be described in "<Processing Procedure>" to be described below may be able to be performed.

The signal transmission unit 201 has a function of generating various signals of the physical layer from reference signals of higher layers and wirelessly transmitting the signals. The signal transmission unit 201 has a function of transmitting reference signals from the antenna elements instructed by the management apparatus 1 via the reception unit 203. The signal reception unit 202 has a function of acquiring signals of higher layers from the received signals of the physical layer.

The reception unit 203 has a function of receiving an instruction from the antenna elements to be used to transmit the reference signals from the management apparatus 1. The reception unit 203 delivers the received instruction to the signal transmission unit 201.

The measurement unit 204 has a function of measuring reception quality (signal to noise ratio (SNR), signal to interference plus noise power ratio (SINR), receiving signal received power (RSRP), or the like) of a wireless signal received by the signal reception unit 202.

The reporting unit 205 has a function of reporting to the management apparatus 1 the reception quality of the radio signal measured by the measurement unit 204.

<Hardware Configuration>

(Management Apparatus)

Figure 8:
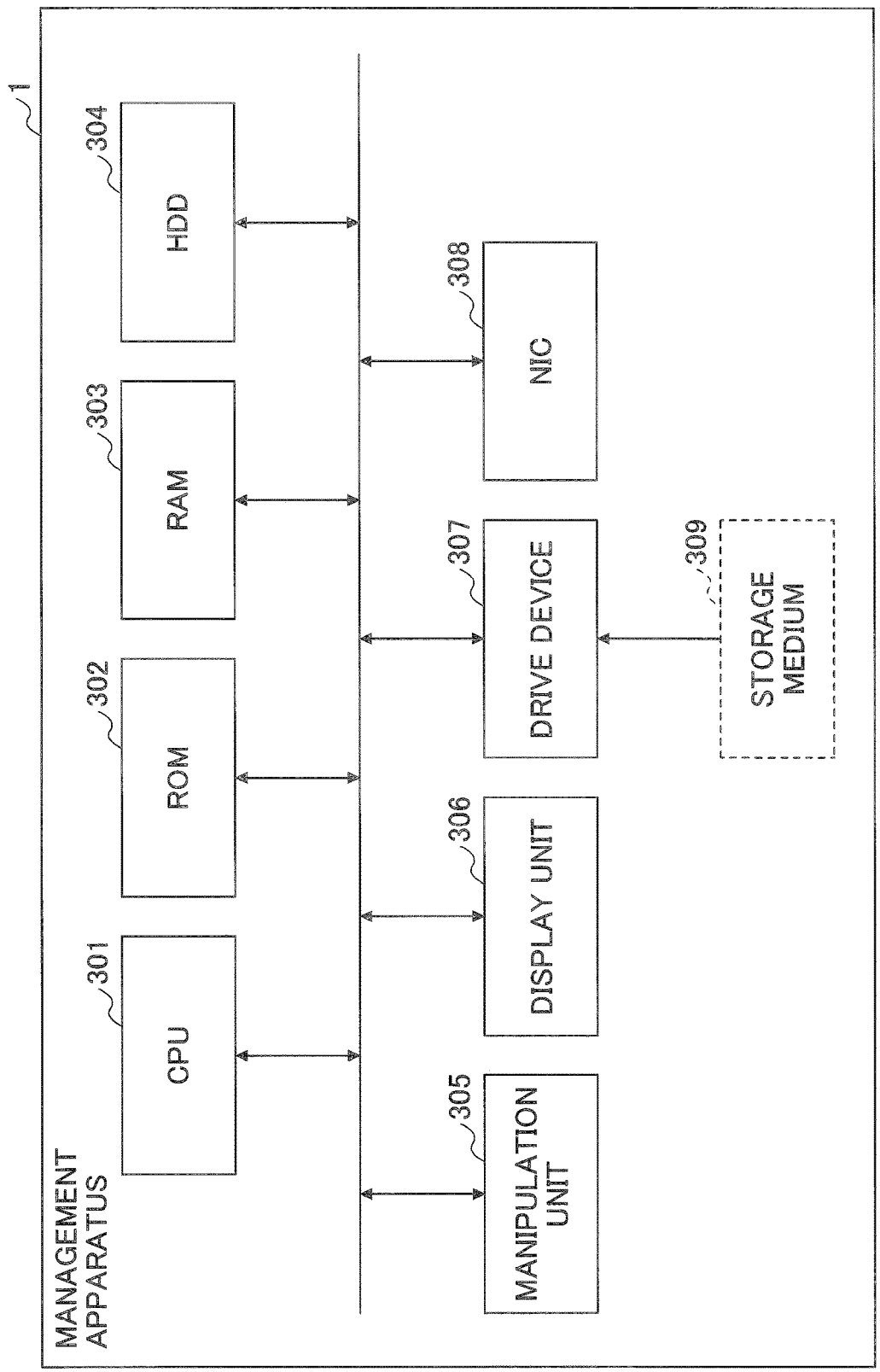
FIG. 8 is a diagram illustrating a hardware configuration example of the management apparatus according to the embodiment.

FIG. 8 is a diagram illustrating a hardware configuration example of the management apparatus according to the embodiment. The management apparatus 1 according to the embodiment includes a CPU 301, a ROM 302, a RAM 303, an HDD 304, a manipulation unit 305, a display unit 306, a drive device 307, a network interface card (NIC) 308.

The CPU 301 is a processor that controls the entire management apparatus 1. The CPU 301 realizes various functions of the management apparatus 1 by executing an operating system, applications, and programs of various services stored in the HDD 304 or the like. The ROM 302 stores various programs and data or the like used by the programs. The RAM 303 is used as a storage region to which a program is loaded or a work area of the loaded program. The HDD 304 stores various kinds of information, programs, and the like.

The manipulation unit 305 is hardware that receives an input manipulation from a user and is, for example, a keyboard or a mouse. The display unit 306 is hardware that performs display for a user.

The drive device 307 reads a program from a storage medium 309 that records a program. The program read by the drive device 307 is installed in, for example, the HDD 304. The NIC 308 is a communication interface that connects the management apparatus 1 to a network to transmit and receive data.

The storage medium 309 is a non-transitory storage medium. Examples of the storage medium 309 include a magnetic storage medium, an optical disc, a magneto-optical storage medium, and a nonvolatile memory.

(Base Station and Mobile Station)

Figure 9:
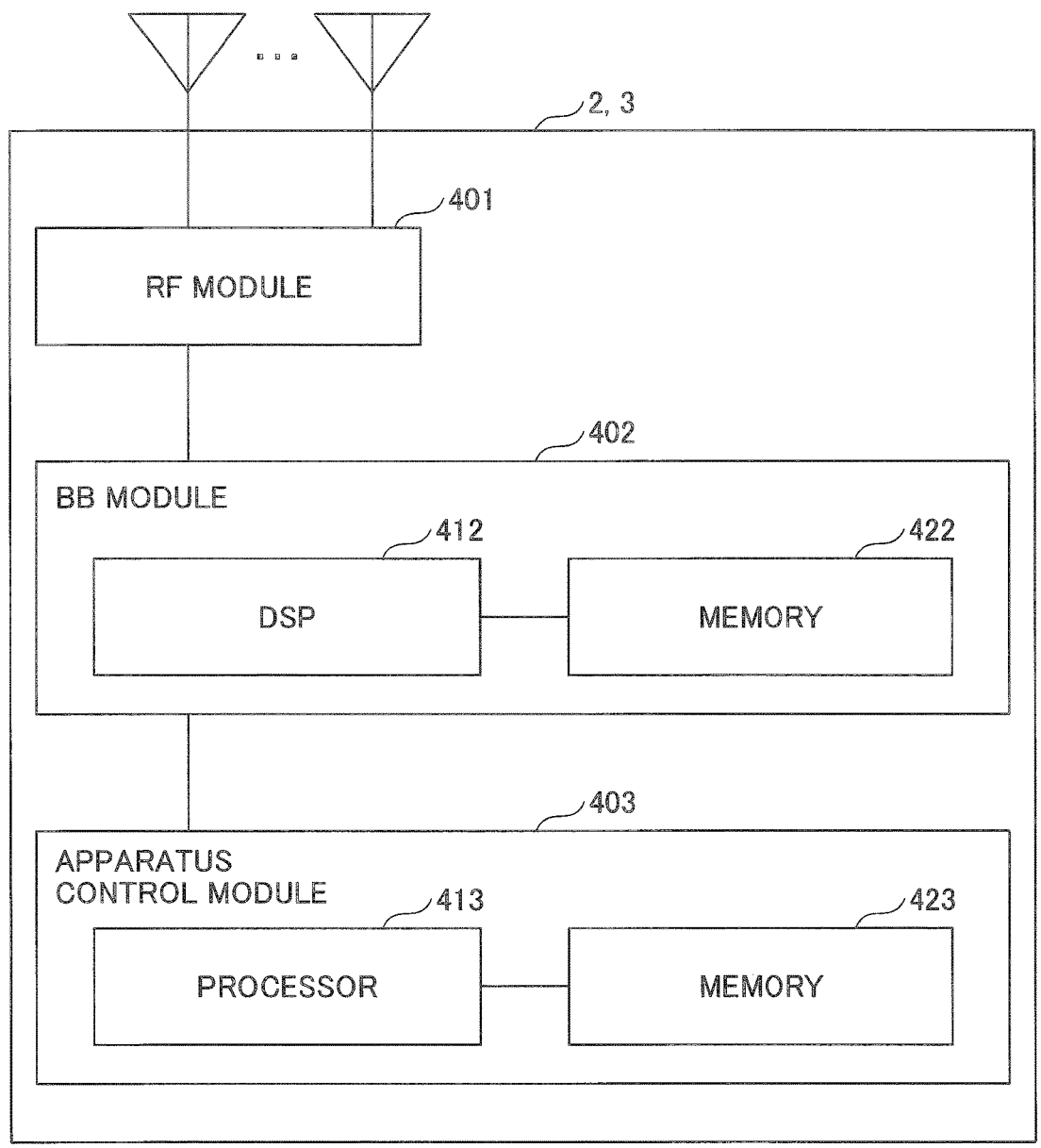
FIG. 9 is a diagram illustrating a hardware configuration example of the base station and the mobile station according to the embodiment.

FIG. 9 is a diagram illustrating a hardware configuration example of the base station and the mobile station according to the embodiment. FIG. 9 illustrates a configuration closer to a mounting example than in FIG. 7. As illustrated in FIG. 9, the base station 2 includes a radio frequency (RF) module 401 that performs a process related to a wireless signal, a baseband (BB) processing module 402 that processes baseband signal, and an apparatus control module 403 that performs process of a higher layer.

The RF module 401 generates a wireless signal to be transmitted from an antenna by performing digital-to-analog (D/A) conversion, modulation, frequency conversion, power amplification, or the like on a digital baseband signal received from the BB processing module 402. The RF module 501 generates a digital baseband signal by performing frequency conversion, analog to digital (A/D) conversion, demodulation, or the like on a received wireless signal and delivers the digital baseband signal to the BB processing module 402. The RF module 401 includes, for example, a part of the signal transmission unit 201 and a part of the signal reception unit 202 illustrated in FIG. 7.

The BB processing module 402 performs a process of converting an IP packet into a digital baseband signal, and vice versa. A digital signal processor (DSP) 412 is a processor that performs signal processing in the BB processing module 402. The memory 422 is used as a work area of the DSP 412. The BB processing module 402 includes, for example, a part of the signal transmission unit 201 and a part of the signal reception unit 202, the reception unit 203, the measurement unit 204, and the reporting unit 205 illustrated in FIG. 7.

The apparatus control module 403 performs protocol processing of an IP layer or the like. The processor 413 is a processor that performs a process performed by the apparatus control module 403. The memory 423 is used as a work area of the processor 413. The apparatus control module 403 may include, for example, the reception unit 203 and the reporting unit 205 illustrated in FIG. 7.

<Processing Procedure>

Next, a processing procedure performed by the wireless communication system according to the embodiment will be described specifically. In the following description, the base station 2 and the mobile station 3 are referred to as "transmission points" for convenience in some cases. In the processing procedure to be described below, a method of selecting antenna elements used to transmit DL reference signals (S13 of FIG. 5) will be described as an example. The processing procedure to be described below can be applied even when the antenna elements used to transmit UL reference signals (S11 of FIG. 5) are selected.

[Selection Method (Part 1)]

In a selection method (part 1), the selection unit 102 of the management apparatus 1 limits the number of antenna elements used to transmit reference signals by narrowing down the number of base stations 2 (the number of transmission points) transmitting the reference signals.

Figure 10:
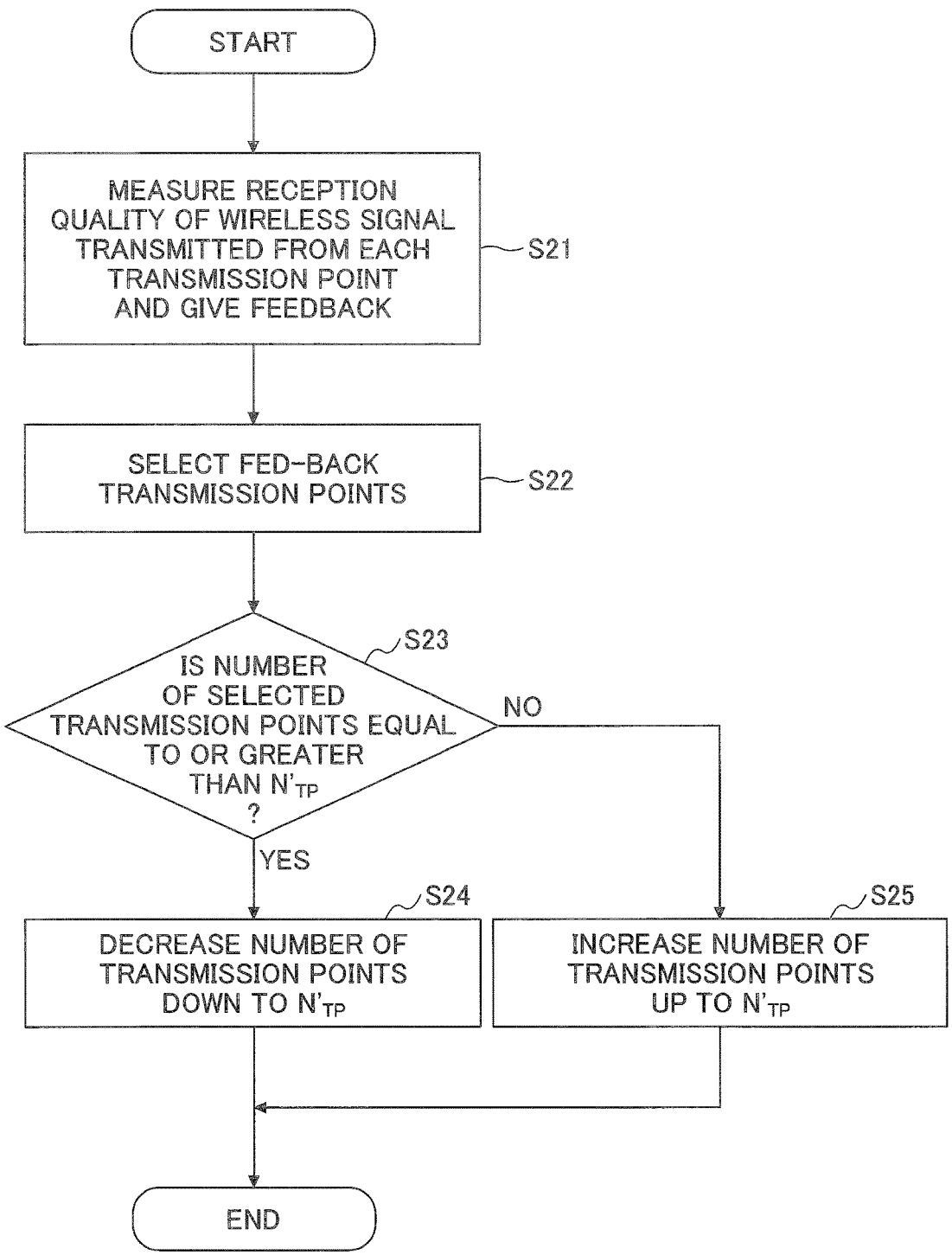
FIG. 10 is a flowchart illustrating an example of a processing procedure according to a selection method (part 1)

FIG. 10 is a flowchart illustrating an example of a processing procedure according to a selection method (part 1).

In step S21, the measurement unit 204 of each mobile station 3 measures reception quality (for example, SNR) of a wireless signal transmitted from each base station 2.

Subsequently, the reporting unit 205 of each mobile station 3 reports to (transmits to) the management apparatus 1 feedback information indicating the measured reception quality and the base station 2 (the transmission point) of which measured reception quality is equal to or greater than a predetermined threshold. The acquisition unit 104 of the management apparatus 1 acquires the feedback information reported by each mobile station 3. The predetermined threshold may differ for each base station 3. For example, each mobile station 3 may use desired reception quality of the wireless signal transmitted from the base station 2 as the predetermined threshold.

In step S22, the selection unit 102 of the management apparatus 1 selects the base stations 2 which are reported (fed back) by the mobile stations 3. Subsequently, in step S23, the selection unit 102 confirms whether the number of selected transmission points is equal to or greater than "$N'_{TP}$." "$N'_{TP}$" is a threshold which is decided in advance as the number of transmission points to be used to transmit reference signals. When the number of selected transmission points is equal to or greater than "$N'_{TP}$," the process proceeds to the processing procedure of step S24. When the number of selected transmission points is less than "$N'_{TP}$," the process proceeds to the processing procedure of step S25.

In step S24, the selection unit 102 of the management apparatus 1 decreases some of the transmission points among the selected transmission points so that the number of selected transmission points is $N'_{TP}$." For example, the selection unit 102 may decrease the number of transmission points for which the number of mobile stations 3 reporting the transmission points is small. The selection unit 102 may decrease the transmission points of which the reported reception quality is the smallest. The selection unit 102 may instruct the mobile stations 3 to increase the predetermined threshold used in the processing procedure of step S21 and cause the mobile stations 3 to report the feedback information again.

In step S25, the selection unit 102 of the management apparatus 1 adds some of the unselected transmission points so that the number of selected transmission points is "$N'_{TP}$." For example, the selection unit 102 may add the transmission points for which the number of mobile stations 3 reporting the transmission points is the largest among the unselected transmission points. The selection unit 102 may also add the transmission points of which the reported reception quality is the largest among the unselected transmission points. The selection unit 102 may add the transmission points for which distances from the selected transmission points are close in order among the unselected transmission points. The selection unit 102 may instruct the mobile stations 3 to decrease the predetermined threshold used in the processing procedure of step S21 and cause the mobile stations 3 to report the feedback information again.

After the processing procedure of steps S21 to S25 described above is completed, the instruction unit 103 of the management apparatus 1 instructs each base station 2 to transmit the reference signals from all the antenna elements included in each base station 2 to each of the selected base stations 2. The instruction unit 103 may further give an instruction of radio resources used to transmit the reference signals or may give an instruction of a series of reference signals or the like.

Here, an operation example of the selection method (part 1) will be described with reference to FIGS. 11A, 11B and 12. To simplify the description, it is assumed that there are two mobile stations 3 (mobile stations 3a and 3b) and there are further eleven base stations 2 (transmission points) in the wireless communication system. In addition, "$N'_{TP}=4$" is assumed.

Figure 11A:
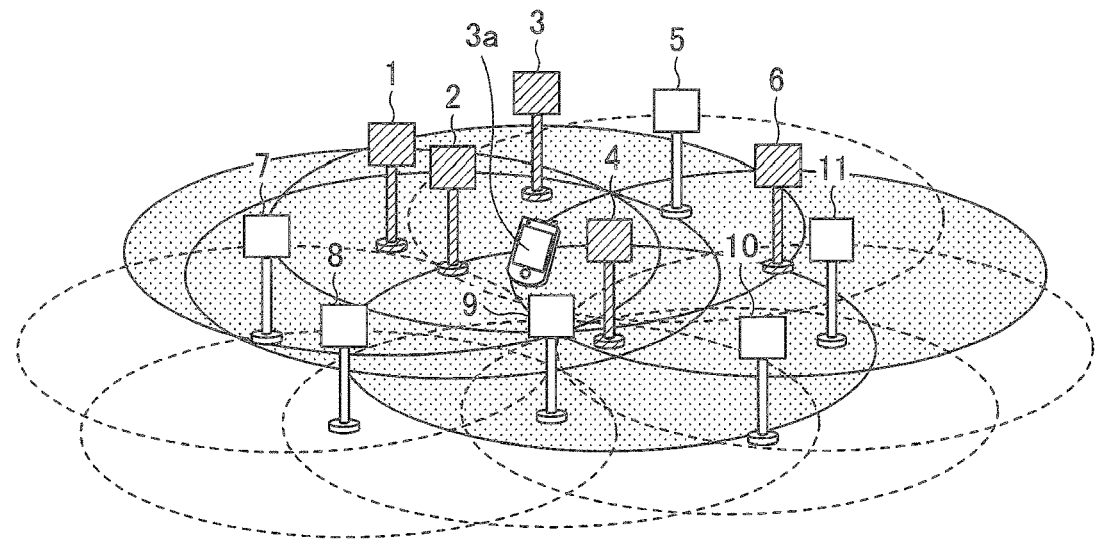
FIG. 11A is a diagram for describing an operation example of the selection method (part 1)
Figure 11B:
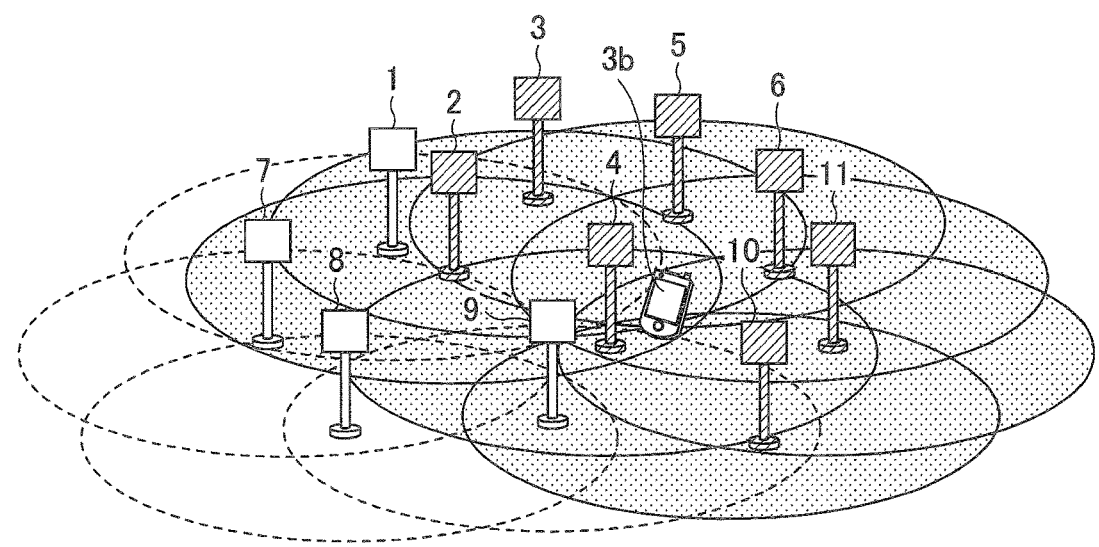
FIG. 11B is a diagram for describing an operation example of the selection method (part 1)

As illustrated in FIG. 11A, for example, the mobile station 3a determines that the reception quality of wireless signals transmitted from the transmission points "1," "2," "3," "4," and "6" is a predetermined threshold. As illustrated in FIG. 11B, the base station 3b is assumed to determine that the reception quality of wireless signals transmitted from, for example, the transmission points "2," "3," "4," "5," "6," "10," and "11" is equal to or greater than the predetermined threshold. An example of feedback information which the mobile stations 3a and 3b report is illustrated in FIG. 12. In the table of FIG. 12, numbers shown in the columns of the mobile stations 3a and 3b indicate levels of the reception quality. As a number is larger, the reception quality is better.

First, the selection unit 102 selects eight transmission points, the transmission points "1," "2," "3," "4," "5," "6," "10," and "11" illustrated in FIG. 12 (S22 of FIG. 10). Subsequently, since "$N'_{TP}=4$" (S23 of FIG. 10), the selection unit 102 determines that it is necessary to decrease three transmission points (S24 of FIG. 10). Here, in FIG. 12, the transmission points "1," "5," "10," and "11" is reported by only one of the mobile stations 3a and 3b. Accordingly, the selection unit 102 decreases these transmission points. Thus, the number of transmission points is decreased to four transmission points "2," "3," "4," and "6."

The selection method (part 1) has been described above. The selection method (part 1) is suitable for, for example, a case in which the positions of the mobile stations 3 present in the wireless communication system are biased. In the processing procedure of step S21 of FIG. 10, the reporting unit 205 of each mobile station 3 may transmit the feedback information including the reception quality of all the base stations 2 capable of measuring the reception quality. The selection unit 102 of the management apparatus 1 may also retain a threshold equivalent to the "predetermined threshold" indicating the processing procedure of step S21 of FIG. 10 and the selection unit 102 may determine whether the reception quality measured by each mobile station 3 is equal to or greater than the predetermined threshold. The value of "N'TP" may be a value that has a width of some extent.

[Selection Method (Part 2)]

In consideration of the reciprocity of TDD, a DL reference signal transmitted from the base station 2 does not arrive at the mobile station 3 either when the reception power of an UL reference signal received by the base station 2 is low. Accordingly, in the selection method (part 2), the selection unit 102 of the management apparatus 1 is assumed to limit the number of antenna elements transmitting reference signals based on the reception power of the reference signal received from each of the plurality of antenna elements included in each base station 2 present in the wireless communication system.

FIG. 13 is a diagram for describing the selection method (part 2). On the left side of FIG. 13, all the antenna elements included in each base station 2 present in the wireless communication system are illustrated. The measurement unit 204 of each base station 2 measures the reception power of the UL reference signal received by each of the plurality of antenna elements included in the base station 2. The reporting unit 205 of each base station 2 reports to (transmits to) the management apparatus 1 the reception power information indicating the measured reception power. The acquisition unit 104 of the management apparatus 1 acquires the reception power information which each mobile station 3 reports.

Subsequently, based on the reception power information reported by each base station 2, the selection unit 102 of the management apparatus 1 selects the plurality of antenna elements of which the reception power is equal to or greater than the predetermined threshold among all the antenna elements included in each base station 2 as the plurality of antenna elements used to transmit the reference signals. Subsequently, the instruction unit 103 of the management apparatus 1 instructs each base station 2 to transmit the reference signals from the plurality of selected antenna elements. The instruction unit 103 may further give an instruction of radio resources used to transmit the reference signals or may give an instruction of a series of reference signals or the like. On the right side of FIG. 13, examples of the antenna elements selected as the plurality of antenna elements used to transmit the reference signals are illustrated.

The selection method (part 2) has been described above. The selection method (part 2) may be combined with the selection method (part 1). That is, by applying the selection method (part 2) to the transmission points selected with the selection method (part 1), the antenna elements used to transmit the reference signals among the plurality of antenna elements included in the transmission points may be further decreased.

[Selection Method (Part 3)]

Figure 14:
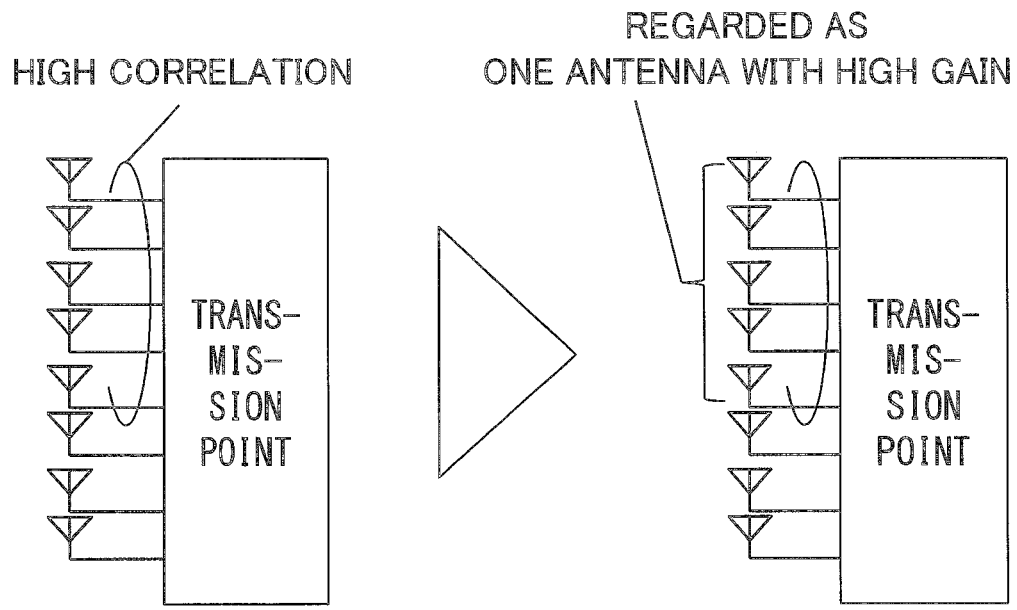
FIG. 14 is a diagram for describing a selection method (part 3).

In a selection method (part 3), the selection unit 102 of the management apparatus 1 is assumed to limit the number of antenna elements transmitting the reference signals based on correlation between the plurality of antenna elements included in each base station 2. More specifically, as illustrated in FIG. 14, the selection unit 102 evaluates correlation between the plurality of antenna elements included in each base station 2 and groups the plurality of antenna elements in a plurality of groups. That is, the selection unit 102 regards the plurality of antenna elements belonging to the same group as one antenna with a high gain. The instruction unit 103 of the management apparatus 1 instructs each base station 2 to transmit the same reference signal (for example, a reference signal multiplied by the same weight) from the plurality of antenna elements belonging to the same group. The instruction unit 103 may further give an instruction of radio resources used to transmit the reference signal or may give an instruction of a series of the reference signals.

The selection unit 102 may, for example, evaluate the correlation using physical distances between the antenna elements as a method of measuring the correlation between the plurality of antenna elements included in each base station 2. Information indicating the physical distances between the antenna elements via a maintenance system or the like may be reported to (transmitted to) the management apparatus 1 in advance. More specifically, for example, the selection unit 102 may group the antenna elements present within a range in which the physical distance between the antenna element is a predetermined value (for example, $10\lambda$) in the same group.

As another method of evaluating the correlation, for example, the selection unit 102 may calculate the correlation between the antenna elements using channel estimation values of the UL reference signals received by the antenna elements in each base station 2 and may group a pair of antenna elements for which the calculated correlation is within a predetermined range (for example, the correlation is 0.8 or more) in the same group. For example, when correlation between an antenna element A and an antenna element B is 0.9, correlation between the antenna element B and an antenna element C is 0.8, and correlation between the antenna element A and the antenna element C is 0.8, the antenna elements A to C may be grouped in the same group. When this method is used, a UL channel estimation value is calculated by the base station 2 and reported to the management apparatus 1.

The selection unit 102 may calculate a plurality of correlations at a predetermined time interval in consideration of a temporal variation in the channel estimation value due to fading and may group a pair of antenna elements for which an average value of the plurality of calculated correlations is within the predetermined range in the same group. That is, the selection unit 102 may perform the grouping using ensemble correlation.

When the [selection method (part 3)] is applied to an UL, that is, the selection unit 102 of the management apparatus 1 limits the number of antenna elements transmitting the reference signals based on the correlation between the plurality of antenna elements included in each mobile station 3, each mobile station 3 may report to the management apparatus 1 the number of plurality of antenna elements included in the mobile station 3 and the physical distance between the antenna elements.

The selection method (part 3) has been described above. The selection method (part 3) may be combined with the selection method (part 1). That is, by applying the selection method (part 3) to the plurality of antenna elements included in the transmission points selected with the selection method (part 1), the antenna elements used to transmit the reference signals may be further decreased.

<Conclusion>

According to an embodiment, there is provided a wireless communication system including a plurality of first wireless stations; a plurality of second wireless stations; and a management apparatus configured to manage the plurality of first wireless stations and the plurality of second wireless stations. The management apparatus includes a selection unit that selects a plurality of antennas to be used to transmit reference signals from a plurality of antennas included in the plurality of first wireless stations or a plurality of antennas included in the plurality of second wireless stations, and an instruction unit that instructs the plurality of first wireless stations or the plurality of second wireless stations to transmit reference signals using the plurality of antennas used to transmit the reference signals and selected by the selection unit. In the wireless communication system, there is provided a technology capable of reducing the number of reference signals transmitted in the wireless communication system and efficiently using radio resources.

The second wireless station may include a reporting unit that reports to the management apparatus feedback information indicating the first wireless station of which reception quality is a predetermined threshold when reception quality of the reference signal transmitted from each of the plurality of antennas included in the plurality of first wireless stations is equal to or greater than the predetermined threshold. The management apparatus may include an acquisition unit that acquires the feedback information from the plurality of second wireless stations. Based on the feedback information, the selection unit selects the plurality of antennas of the first wireless stations for which the reception quality of the reference signals in the plurality of second wireless stations is equal to or greater than the predetermined threshold among the plurality of antennas included in the plurality of first wireless stations, as the plurality of antennas used to transmit the reference signals. Thus, primarily, it is possible to efficiently decrease the number of reference signals when the positions of the mobile stations 3 present in the wireless communication system are biased.

The first wireless station may include a reporting unit that measures reception power of the reference signals transmitted from the plurality of second wireless stations using each of the plurality of antennas included in the first wireless station and reports to the management apparatus reception power information indicating the measured reception power. The management apparatus may include an acquisition unit that acquires the reception power information from the plurality of first wireless stations. Based on the reception power information, the selection unit may select the plurality of antennas for which the reception power of the reference signals transmitted from the plurality of second wireless stations is equal to or greater than the predetermined threshold among the plurality of antennas included in the plurality of first wireless stations, as the plurality of antennas used to transmit the reference signals. Thus, by using the reciprocity of TDD, it is possible to narrow down the antenna elements transmitting the reference signals in each transmission point, and thus it is possible to efficiently decrease the number of reference signals.

The selection unit may evaluate correlation between the plurality of antennas included in the plurality of first wireless stations and group the plurality of antennas in a plurality of groups. The instruction unit may instruct the plurality of first wireless stations to transmit the same reference signal from the plurality of antennas belonging to the same group. Thus, in each transmission point, the plurality of antennas with high correlation can be regarded as one high-efficient antenna, and thus it is possible to efficiently decrease the number of reference signals.

According to an embodiment, there is provided a management apparatus in a wireless communication system that a plurality of first wireless stations, a plurality of second wireless stations, and a management apparatus managing the plurality of first wireless stations and the plurality of second wireless stations. The management apparatus includes: a selection unit configured to select a plurality of antennas to be used to transmit reference signals from a plurality of antennas included in the plurality of first wireless stations or a plurality of antennas included in the plurality of second wireless stations, and an instruction unit that instructs the plurality of first wireless stations or the plurality of second wireless stations to transmit reference signals using the plurality of antennas used to transmit the reference signals and selected by the selection unit. In the management apparatus, there is provided a technology capable of reducing the number of reference signals transmitted in the wireless communication system and efficiently using radio resources.

<Supplements of Embodiment>

The term, the "antenna element" used in the embodiment can be replaced with an "antenna" or an "antenna port." The antenna port means a logical port associated with one physical antenna or a plurality of physical antennas defined in 3GPP.

The configuration of each apparatus (the management apparatus 1/the base station 2/the mobile station 3) described in the embodiment may be a configuration realized when a program is executed by a CPU (processor) in the apparatus including the CPU and a memory, may be a configuration realized by hardware such as a hardware circuit having a process logic described in the embodiment, or may be a configuration in which a program and hardware are mixed.

The embodiments of the invention have been described above, but the disclosed invention is not limited to the embodiments. Those skilled in the art can understand various modifications, corrections, substitutions, replacements, and the like. To promote understanding of the invention, the description has been made using examples of specific numerical values. These numerical values are merely examples and any appropriate values may be used unless otherwise stated. The classification of the items in the foregoing description are not fundamental in the invention, but matters described in two or more items may be combined to be used as necessary or matters described in any item may be applied to matters described in other items (unless the matters are inconsistent). The boundaries of the functional units or the processing units in the functional block diagrams may not necessarily correspond to the boundaries of physical components. Operations of the plurality of functional units may be performed physically by one component or an operation of one functional unit may be performed physically by a plurality of components. The procedures of the sequences and the flowcharts described in the embodiments may be switched in a procedure without being inconsistent. To facilitate the description of the processes, the management apparatus 1/the base station 2/the mobile station 3 have been described with reference to the functional block diagrams, but the devices may be realized hardware, software, or a combination thereof. Software operated by the processor included in the management apparatus 1 according to the embodiments of the invention, software operated by the processor included in the base station 2 according to the embodiments of the invention, and software operated by the processor included in the mobile station 3 according to the embodiments of the invention may each be stored in any appropriate storage medium such as a random access memory (RAM), a flash memory, a read-only memory (ROM), an EPROM, an EEPROM, a register, a hard disk (HDD), a removable disk, a CD-ROM, a database, and a server.

In the embodiment, the base station 2 and the mobile station 3 are examples of the first and second wireless stations, respectively, or examples of the second and first wireless stations, respectively.

Information transmission (notification, reporting) may be performed not only by methods described in an aspect/embodiment of the present specification but also a method other than those described in an aspect/embodiment of the present specification. For example, the information transmission may be performed by physical layer signaling (e.g., DCI (Downlink Control Information), UCI (Uplink Control Information)), upper layer signaling (e.g., RRC signaling, MAC signaling, broadcast information (MIB (Master Information Block), SIB (System Information Block))), other signals, or combinations thereof. Further, an RRC message may be referred to as RRC signaling. Further, an RRC message may be, for example, an RRC connection setup message, an RRC connection reconfiguration message, or the like.

An aspect/embodiment described in the present specification may be applied to a system that uses LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), other appropriate systems, and/or a next generation system enhanced based thereon.

Determination or judgment may be performed according to a value (0 or 1) represented by a bit, may be performed according to a boolean value (true or false), or may be performed according to comparison of numerical values (e.g., comparison with a predetermined value).

It should be noted that the terms described in the present specification and/or terms necessary for understanding the present specification may be replaced by terms that have the same or similar meaning. For example, a channel and/or a symbol may be a signal. Further, a signal may be a message.

There is a case in which a UE may be referred to as a subscriber station, a mobile unit, subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

An aspect/embodiment described in the present specification may be used independently, may be used in combination, or may be used by switching according to operations. Further, transmission of predetermined information (e.g., transmission of "it is X") is not limited to explicitly-performed transmission. The transmission of predetermined information may be performed implicitly (e.g., explicit transmission of predetermined information is not performed).

As used herein, the term "determining" may encompasses a wide variety of actions. For example, "determining" may be regarded as calculating, computing, processing, deriving, investigating, looking up (e.g., looking up in a table, a database or another data structure), ascertaining and the like. Also, "determining" may be regarded as receiving (e.g., receiving information), transmitting (e.g., transmitting information), inputting, outputting, accessing (e.g., accessing data in a memory) and the like. Also, "determining" may be regarded as resolving, selecting, choosing, establishing, comparing and the like. That is, "determining" may be regarded as a certain type of action related to determining.

As used herein, the phrase "based on" does not mean, unless otherwise noted, "based on only". In other words, the phrase "base on" means both "based on only" and "based on at least".

Also, the order of processing steps, sequences or the like of an aspect/embodiment described in the present specification may be changed as long as there is no contradiction. For example, in a method described in the present specification, elements of various steps are presented in an exemplary order. The order is not limited to the presented specific order.

Input/output information, etc., may be stored in a specific place (e.g., memory) or may be stored in a management table. The input/output information, etc., may be overwritten, updated, or added. Output information, etc., may be deleted. Input information, etc., may be transmitted to another apparatus.

Transmission of predetermined information (e.g., transmission of "it is X") is not limited to explicitly-performed transmission. The transmission of predetermined information may be performed implicitly (e.g., explicit transmission of predetermined information is not performed).

Information, a signal, etc., described in the present specification may be represented by using any one of the various different techniques. For example, data, an instruction, a command, information, a signal, a bit, a symbol, a chip or the like described throughout in the present specification may be represented by voltage, current, electromagnetic waves, magnetic fields or a magnetic particle, optical fields or a photon, or any combination thereof.

The present invention is not limited to the above embodiments and various variations, modifications, alternatives, replacements, etc., may be included in the present invention without departing from the spirit of the invention.

The present application is based on and claims the benefit of priority of Japanese Priority Application No. 2016-048754 filed on Mar. 11, 2016, the entire contents of which are hereby incorporated by reference.

EXPLANATIONS OF LETTERS OR NUMERALS 1 management apparatus
2 base station
3 mobile station
101 communication unit
102 selection unit
103 instruction unit
104 acquisition unit
201 signal transmission unit
202 signal reception unit
203 reception unit
204 measurement unit
205 communication unit

The invention claimed is:

1. A wireless communication system comprising:
a plurality of first wireless stations;
a plurality of second wireless stations; and
a management apparatus configured to manage the plurality of first wireless stations and the plurality of second wireless stations,
wherein the management apparatus includes
a selection unit that selects a plurality of antennas to be used to transmit reference signals from a plurality of antennas included in the plurality of first wireless stations or a plurality of antennas included in the plurality of second wireless stations, and
an instruction unit that instructs the plurality of first wireless stations or the plurality of second wireless stations to transmit reference signals using the plurality of antennas used to transmit the reference signals and selected by the selection unit,
wherein each first wireless station includes a reporting unit that measures reception power of the reference signals transmitted from the plurality of second wireless stations using each of the plurality of antennas included in the first wireless station and reports to the management apparatus reception power information indicating the measured reception power,
wherein the management apparatus includes an acquisition unit that acquires the reception power information from the plurality of first wireless stations, and
wherein based on the reception power information, the selection unit selects the plurality of antennas with which the reception power of the reference signals transmitted from the plurality of second wireless stations is equal to or greater than the predetermined threshold among the plurality of antennas included in the plurality of first wireless stations, as the plurality of antennas used to transmit the reference signals.

2. The wireless communication system according to claim 1,
wherein the second wireless station includes a reporting unit that reports to the management apparatus feedback information indicating the first wireless stations for which reception quality is equal to or greater than a predetermined threshold when reception quality for the reference signal transmitted from each of the plurality of antennas included in the plurality of first wireless stations is equal to or greater than the predetermined threshold, wherein the management apparatus includes an acquisition unit that acquires the feedback information from the plurality of second wireless stations, and wherein based on the feedback information, the selection unit selects the plurality of antennas of the first wireless stations for which the reception quality of the reference signals in the plurality of second wireless stations is equal to or greater than the predetermined threshold among the plurality of antennas included in the plurality of first wireless stations.

3. The wireless communication system according to claim 1, wherein the selection unit evaluates correlation between the plurality of antennas included in the plurality of first wireless stations and groups the plurality of antennas into a plurality of groups, and wherein the instruction unit instructs the plurality of first wireless stations to transmit a same reference signal from the plurality of antennas belonging to a same group.

4. A management apparatus in a wireless communication system comprising a plurality of first wireless stations, a plurality of second wireless stations, and a management apparatus managing the plurality of first wireless stations and the plurality of second wireless stations, the management apparatus comprising:

a selection unit configured to select a plurality of antennas to be used to transmit reference signals from a plurality of antennas included in the plurality of first wireless stations or a plurality of antennas included in the plurality of second wireless stations, and an instruction unit that instructs the plurality of first wireless stations or the plurality of second wireless stations to transmit reference signals using the plurality of antennas used to transmit the reference signals and selected by the selection unit, wherein each first wireless station reports to the management apparatus reception power information indicating measured reception power of the reference signals transmitted from the plurality of second wireless stations measured by each of the plurality of antennas included in the first wireless station, wherein the management apparatus includes an acquisition unit that acquires the reception power information from the plurality of first wireless stations, and wherein based on the reception power information, the selection unit selects the plurality of antennas with which the reception power of the reference signals transmitted from the plurality of second wireless stations is equal to or greater than the predetermined threshold among the plurality of antennas included in the plurality of first wireless stations, as the plurality of antennas used to transmit the reference signals.

* * * * *